ated July 21, 1964

3,141,779
STACKED SLICED FOOD PRODUCT AND
METHOD OF PREPARING SAME
Everett V. Podebradsky and Floyd C. Olson, Madison, Wis., assignors to Oscar Mayer & Co., Inc., Chicago, Ill., a corporation of Illinois
No Drawing. Filed May 24, 1961, Ser. No. 112,189
13 Claims. (Cl. 99—166)

This invention is directed to a new and improved release agent in food products formed from product slices arranged in face-to-face relation, and to the method of preparing such food products.

Many attempts have been made to develop suitable release agents for use with refrigerated food products composed of product slices which are stacked or shingled in face-to-face contacting relation. Such products include sliced bacon, ham slices, cheese slices, combinations of ham and cheese slices, etc. These products as well as other products of a similar nature exhibit a common problem, namely, that of individual slice separation while in refrigerated condition. The product slices have tacky surfaces due to the nature of the food material and the surfaces upon contact with one another under refrigeration conditions strongly adhere to an extent that considerable care must be exercised during separation of individual slices to prevent rupture or tearing of the slices.

Attempts to answer the foregoing problem have included the application of many different edible materials in powder or oily form to the surfaces of the product slices. By way of example, methylcellulose in various solution strengths with and without wetting agents, acetylated monoglycerides, Irish moss extractive solutions, corn oil, finely ground salt, finely ground sucrose and lactose have been tried without adequate success. The formation of thicker food product slices will aid in preventing rupture or tearing during separation but this approach does not answer the problem of providing ready separation between refrigerated slices. Interleaving with paper strips has been commercially practiced and has permitted ready separation of the individual slices. However, this procedure is quite costly and adds to the complexity of pricing the product based solely on the total weight of the edible portion thereof.

It is an object of the present invention to provide a new and improved release agent in a sliced food product, the slices thereof being subject to ready separation from face-to-face contact even under refrigerated conditions.

Another object is to provide a new and improved food product formed from stacked product slices arranged in face-to-face relation including the provision of a special coating of gelatinous alginate on at least one of the contacting faces of the product slices providing for ready separation thereof.

Still a further object is to provide a new and improved method of preparing a food product formed from product slices arranged in face-to-face relation, the method including the special application of a unique release agent on at least one face of each product slice during the preparation of the product.

Other objects not specifically set forth will become apparent from the following detailed description of the invention.

The release agent of the present invention is a gelatinous alginate, namely, calcium alginate. This gelatinous material is deposited on a stacking surface of a product slice in the form of a coating which is quite thin and normally undetectable. In this regard there is no change in appearance of the product and the taste thereof is not noticeably affected. The gelatinous alginate as used in accordance with the teachings of the present invention has been found to maintain its effective form at room temperature without melting or any other undesirable degradation. In this regard the gelatinous alginate is unusually suited for the purposes of the invention as distinguished from the large number of other materials which have been tested with little or no success. With the use of this material as a release agent, the product slices need not be increased in thickness for effective separation without rupture or tearing.

The gelatinous alginate should be formed on the surface of the product slice. This is accomplished by preparing an aqueous sodium alginate suspension, preferably spraying this onto the slice surface, and then spraying an alginate gel-forming substance onto the alginate coating to form the gelatinous material. A calcium chloride solution is used for this purpose and the gelatinous calcium alginate is formed immediately on the slice surface with the slice ready for stacking against the surface of another slice of product.

The following is an example of the method of preparing a food product in accordance with the teachings of the present invention:

Bacon from bellies weighing about 12 pounds was sliced to form 24 slices per pound. One side of each slice was sprayed with an aqueous suspension of highly refined sodium aliginate. This suspension contained approximately 1.6% solids by weight. The alginate coating was applied on the basis of approximately 0.24 oz. per sq. ft. of bacon slice surface area. A 5% solution of calcium chloride was then sprayed over the alginate coating and applied to an extent of about 0.028 oz. per sq. ft. of bacon surface area. The bacon slices were immediately shingled, vacuum packaged and stored at a temperature of approximately 35° F. Subsequent use of the bacon product resulted in ready separation of the individual slices whereas similar untreated beacon products exhibited frequent tearing upon efforts to separate the individual slices thereof.

The release agent of the present invention may be advantageously used with any type of food product exhibiting a tendency to cohere or adhere upon sliced stacking under refrigeration conditions. Examples of such products include meat and cheese slices as well as combinations thereof. Preferably, the alginate suspension used will have a solids content of from about 1% to 2% by weight and the calcium chloride aqueous solution will have a concentration of about 5%. The alginate coating will preferably be applied to a thickness of from about 0.003 to 0.005 of an inch. With regard to preferred coatings, where a 1% concentration of sodium alginate is applied as a layer of about 0.003 inch thick (or 0.059 gram of dry sodium alginate per square foot of surface) the minimum amount of calcium chloride preferably used will be about one-tenth the amount of sodium alginate (or 0.0059 gram of calcium chloride per square foot). Where a 2% concentration of sodium alginate is applied as a layer of about 0.005 inch thick (or 0.23 gram of dry sodium alginate per square foot) as much as equal amounts of calcium chloride may be used (0.23 gram per square foot). Thus calcium chloride may be used in excess within the preferred ranges specified. While the quantity of the gelatinous alginate applied to a product slice may vary with the shape of the slice, the quantity applied to an average bacon slice may increase the weight thereof from about 4% to 5%.

Obviously certain modifications and variations of the invention as hereinbefore set forth may be made without departing from the spirit and scope thereof, and therefore only such limitations should be imposed as are indicated in the appended claims.

We claim:
1. In a food product formed from stacked product slices arranged in face-to-face relation, the provision of a coat- ing of gelatinous alginate on at least one of the contacting faces of the product slices providing for ready separation of said product slices.

2. The food product of claim 1 which comprises bacon slices.

3. The food product of claim 1 which comprises ham slices.

4. The food product of claim 1 which comprises cheese slices.

5. The food product of claim 1 which comprises combinations of ham and cheese slices.

6. The food product of claim 1 wherein said coating has a thickness of from about 0.003 to 0.005 of an inch.

7. The food product of claim 1 wherein said gelatinous alginate is formed from sodium alginate reacted with calcium chloride.

8. The method of preparing a food product formed from product slices arranged in face-to-face relation, said method comprising applying a coating of alginate suspension on at least one face of each product slice, applying an alginate gel-forming substance to said coating to form on each product slice an alginate gel coating, and stacking said product slices in face-to-face contacting relation with an alginate gel coating between each product slice.

9. The method of claim 8 wherein the coating and gel-forming substance are both applied by spraying.

10. The method of claim 8 wherein the coating is from about 0.003 to 0.005 of an inch thick and said gel-forming substance is applied in an amount of at least about one-tenth of the amount of alginate gel-forming substance.

11. The method of preparing a food product formed from product slices arranged in face-to-face relation, said method comprising applying a coating of an aqueous sodium alginate suspension on at least one face of each product slice, applying a solution of calcium chloride to said coating to form on each product slice an alginate gel coating, and stacking said product slices in face-to-face contacting relation with an alginate gel coating between each coating slice.

12. The method of preparing a food product formed from product slices arranged in face-to-face relation, said method comprising applying a coating of an aqueous sodium alginate suspension having from about 1% to 2% solids on at least one face of each product slice, applying a solution of calcium chloride to said coating to form on each product slice an alginate gel coating, said calcium chloride solution having a concentration of about 5%, and stacking said product slices in face-to-face contacting relation with an alginate gel coating between each product slice.

13. The method of claim 12 wherein the coating is from about 0.003 to 0.005 of an inch thick and the calcium chloride is applied in an amount of at least about one-tenth of the amount of sodium alginate.

References Cited in the file of this patent

UNITED STATES PATENTS

| | | |
|---|---|---|
| 2,785,075 | Malecki | Mar. 12, 1957 |
| 2,798,814 | Rivoche | July 9, 1957 |
| 2,803,214 | Hensgen | Aug. 20, 1957 |
| 2,877,120 | Bush | Mar. 10, 1959 |
| 2,927,029 | Long | Mar. 1, 1960 |